Oct. 8, 1946.  P. L. NEWBOLD  2,408,872
HOG TRAP
Filed Sept. 18, 1943
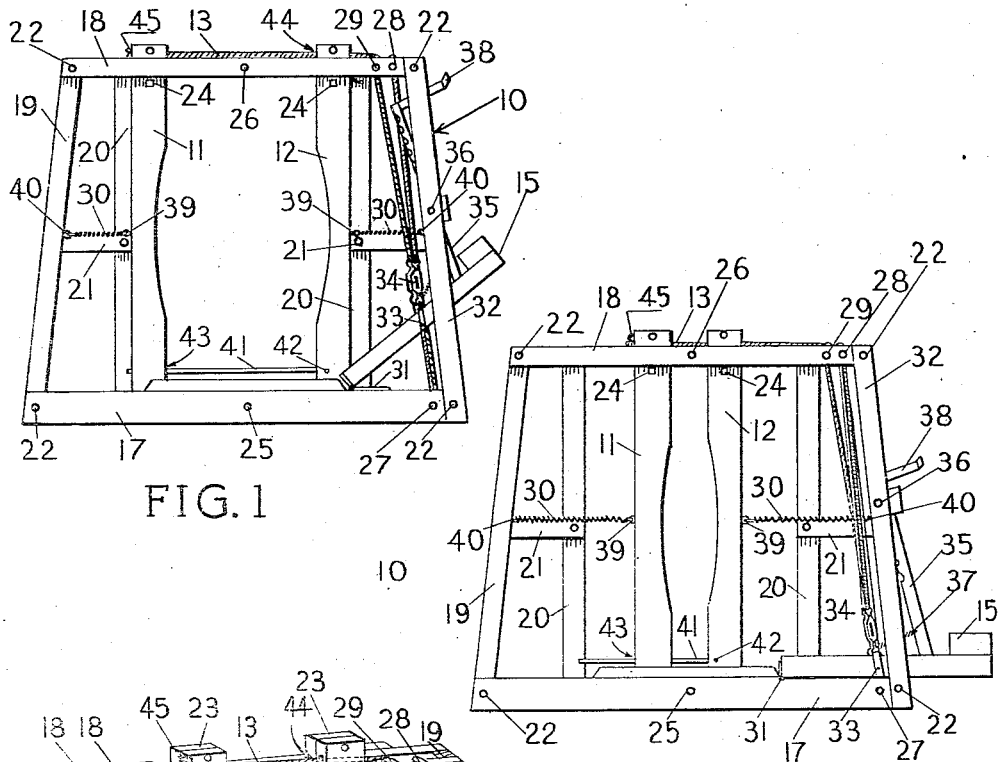
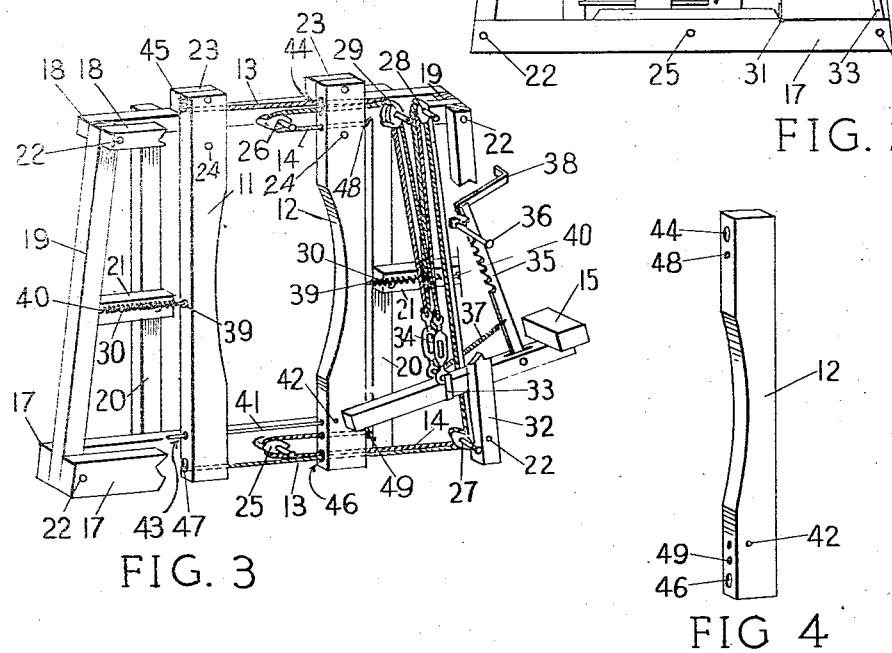
Inventor Patented Oct. 8, 1946

2,408,872

UNITED STATES PATENT OFFICE 2,408,872

HOG TRAP

Park L. Newbold, Cedar Rapids, Iowa

Application September 18, 1943, Serial No. 502,995

3 Claims. (Cl. 119—98)

This invention relates to a trap for catching and holding hogs for ringing, castrating or other purposes to which it may be adapted.

It is the object of my invention to provide a device of simple and inexpensive construction that will catch and hold a hog without injury and with minimum effort of the operator.

Another object of my invention is to provide a device that will permit the hog to pass freely through the trap after being released.

Other and further features and objects of the invention will be more apparent to those skilled in the art upon a consideration of the accompanying drawing and following specification, wherein is disclosed a single exemplary embodiment of the invention, with the understanding, however, that such changes may be made therein as fall within the scope of the appended claims, without departing from the spirit of the invention.

Figure 1 is a front view of my device in open position and showing the foot operating pedal in place for downward movement.

Figure 2 is a front view showing the device in closed position and the frame members in general.

Figure 3 is a cutaway view, showing the operating mechanism and illustrating in particular, the location of the pulleys.

Figure 4 is a side view of the right holding member showing the upper and lower positions of the openings through which the operating ropes pass.

Referring now to the drawing a preferred embodiment of my invention includes a frame indicated generally at 10, trapping members 11—12, cooperating ropes 13—14, and pedal 15.

The frame 10 is composed of two horizontal parallel lower members 17, two horizontal parallel upper members 18, diagonal upright converging side members 19, perpendicular upright members 20 and horizontal braces 21. Members 17—18 and 19 are secured together by bolts at 22.

The trapping element consists generally of two master members 11—12 movable horizontally between parallel upper and lower frame members 17—18, suspending blocks 23 and ascension stops 24. The holding members 11—12 are shaped to properly fit the hog's neck and are operated by the action of ropes 13—14 placed over pulleys 25, 26, 27, 28, 29, withdrawing springs 30 and cooperating pedal 15. The pedal 15 is engaged to the lower frame member 17 by a hinge 31 and extends through a guide formed by an auxiliary diagonal frame member 32.

The ropes 13—14 are engaged to the pedal 15 at 33 by a twin turnbuckle arrangement 34 that permits adjustments of the master holding members 11—12. The pedal 15 is held in any position desired by a ratchet member 35 held against bolt 36 by spring 37 and released by handle 38.

The master holding members 11—12 are returned to open position by withdrawing springs 30 attached at 39 and 40. As a precaution against damage to rope 14 by the hog's hoofs as it proceeds through the trap after being released a protecting bar 41 is engaged to the right master holding member 12 at 42 and passes freely through left holding bar 11 at opening 43.

Referring now again to Figure 3, the operating rope 13 is placed through the turnbuckle 34 and knotted at the correct distance from each end. One end is placed over pulley 29, through large opening in right member 12 at 44 and engaged to left member 11 at 45. The other end of rope 13 is placed over pulley 28 thence downward over pulley 27 then through member 12 at 46 and engaged to left member 11 at 47.

Rope 14 is placed through the other turnbuckle at 34 and likewise knotted at the proper distance from each end. One end is placed over pulley 29, then through member 12 at 44 thence around pulley 26 and engaged to member 12 at 48. The other end of rope 14 is placed over pulley 28 thence downward over pulley 27, through member 12 at 46, around pulley 25 and engaged to member 12 at 49.

I have referred to 13 and 14 as operating ropes and preferably use this type of connection, however, it is understood that cables, chains, or other means may be used.

In use, as the hog's head enters the space between the holding members, the operator pushes down on the pedal 15 which causes members 11—12 to move toward and against the hog's neck at equal speed and pressure. As the desired tightness is obtained, the ratchet arm member 35 holds the position securely and the operator proceeds with the ringing or work being done.

To release the hog, the operator again pushes down on pedal 15 and grasps handle 38. This releases ratchet arm 35 from holding bolt 36 causing springs 30 to return members 11—12 to open position, permitting the hog to pass through without injury.

The trap may be attached to a chute and become an integral part of it or it may be placed in a door or runway, whichever is desired.

I claim as my invention:

1. In a hog trap, the combination of a pair of lower parallel horizontal frame members, a pair of upper parallel horizontal frame members, a left inwardly converging side member, a right inwardly converging side member, a left perpendicular stationary attaching member with horizontal brace, a right perpendicular stationary attaching member with horizontal brace, these elements secured together by suitable means to form a frame unit, a pair of movable master holding members shaped to the contour of a hog's neck and supported between the upper and lower horizontal frame members, a pedal secured to a lower horizontal frame member, a ratchet arm attached to the pedal, an auxiliary pedal guide member placed parallel to the right diagonal side member, a bolt placed through the auxiliary and side member to engage the ratchet arm, flexible connecting means secured to the pedal, placed over and around twin sets of pulleys adjacent to the upper right frame corner, twin pulleys at the lower right frame corner and single pulleys supported between the upper and lower horizontal frame members at their centers and attached to the movable master holding members so that a downward movement of the pedal causes the master members to move toward the center at equal speed and pressure, a withdrawing spring engaged to the left diagonal frame side member and left master holding member midway between their upper and lower ends, and a withdrawing spring engaged to the right diagonal frame side member and to the right master holding member midway between their upper and lower ends for the purpose of returning the master holding members to open position as controlled by the pedal and ratchet arm.

2. In a hog trap, the combination of two lower parallel members, two upper parallel members, converging upright side members, an auxiliary right guide member, perpendicular upright stationary attaching members with horizontal braces secured together to form a frame, two master movable holding members supported between the upper and lower horizontal frame members, suspending blocks attached to the top of the master members, a safety protective rod attached to the right master holding member adjacent to the lower parallel frame members and extending horizontally through an opening in the left master holding member; single pulleys supported between the upper and lower horizontal frame members at the upper and lower frame center, twin pulleys at the right lower frame corner, two sets of twin pulleys adjacent to the upper right frame corner, a pedal attached to a lower horizontal frame member, a ratchet arm attached to the pedal, flexible connecting means attached to the pedal and extending upward and over the twin sets of pulleys to a final anchorage at the upper and lower ends of the master holding members, and a withdrawing spring attached centrally to each master holding member and diagonal side member, to effect movement of the master holding members toward and away from each other in relation to the position of the pedal.

3. In a hog trap, a combination of a frame composed of upper and lower horizontal members and diagonal side members, two master perpendicular holding members movable equally horizontally between the upper and lower horizontal frame members, a pedal attached to a lower horizontal frame member, a ratchet arm engaged to the pedal, single pulleys supported between the upper and lower horizontal frame members at the upper and lower frame center, twin pulleys at the right lower frame corner, two sets of twin pulleys adjacent to the upper right frame corner, flexible connecting means engaged to the pedal and extending upward, thence over this arrangement of pulleys to a final anchorage at the upper and lower ends of the master holding members, a withdrawing spring attached centrally to each of the right and left master holding members and its adjacent diagonal side member, and a protecting bar engaged to one of the master holding members above and adjacent to the lower center pulley and extending through the opposite master member.

PARK L. NEWBOLD.